United States Patent [19]

Nakazawa et al.

[11] Patent Number: 5,475,512
[45] Date of Patent: Dec. 12, 1995

[54] HEAD-UP DISPLAY AND A COMBINER USED TO CONTROL DIFFRACTION OF LIGHT INCLUDING A HOLOGRAM WITH A HALF WIDTH BETWEEN 200-400 NM

[75] Inventors: Norihito Nakazawa; Shoichi Takeuchi; Hiroaki Shimozono; Yuji Aizawa, all of Yokohama, Japan

[73] Assignee: Asahi Glass Company Ltd., Tokyo, Japan

[21] Appl. No.: 194,344

[22] Filed: Feb. 8, 1994

[30] Foreign Application Priority Data

Feb. 9, 1993 [JP] Japan ................................. 5-044561

[51] Int. Cl.⁶ .............................. G02B 5/32; G03H 1/00
[52] U.S. Cl. ............................... 359/13; 359/14; 359/629; 359/630
[58] Field of Search ............................ 359/13, 14, 629, 359/630

[56] References Cited

U.S. PATENT DOCUMENTS

| | | | |
|---|---|---|---|
| 3,993,398 | 11/1976 | Noguchi et al. | 359/13 |
| 4,613,200 | 9/1986 | Hartman | 359/13 |
| 5,066,102 | 11/1991 | Hirano | 359/630 |
| 5,153,751 | 10/1992 | Ishikawa et al. | 359/13 |
| 5,157,549 | 10/1992 | Suzuki et al. | 359/13 |
| 5,210,626 | 5/1993 | Kumayama et al. | 359/13 |
| 5,243,448 | 9/1993 | Banbury | 359/13 |
| 5,313,292 | 5/1994 | Wood et al. | 359/13 |

FOREIGN PATENT DOCUMENTS 4-291221  10/1992  Japan .

*Primary Examiner*—Frank Gonzalez
*Assistant Examiner*—Jason D. Eisenberg
*Attorney, Agent, or Firm*—Oblon, Spivak, McClelland, Maier, & Neustadt

[57] ABSTRACT

A hed-up display comprises a light source and a liquid crystal display device for displaying an image, and a hologram arranged on a windshield glass of a vehicle to diffract the light to an observer, wherein the hologram has the half width of the diffraction spectrum so that a white light entering into the vehicle from the outside is diffracted as substantially a white light.

11 Claims, 10 Drawing Sheets

RELATIVE SPECTRAL DISTRIBUTION

WAVELENGTH (nm)

HEAD-UP DISPLAY AND A COMBINER USED TO CONTROL DIFFRACTION OF LIGHT INCLUDING A HOLOGRAM WITH A HALF WIDTH BETWEEN 200-400 NM

BACKGROUND OF THE INVENTION

1. Field of the Invention

The present invention relates to a head-up display (hereinbelow, referred to as HUD) and a combiner used for the HUD.

2. Discussion of Background

Recently, there has been used a HUD in order to display information to a driver in a vehicle. The HUD is so constructed that the driver can read information without substantially moving his eyepoint at the drivers seat by displaying an optical information projected from an information projecting means such as a liquid crystal display device or the like on a combiner such as a hologram, a half mirror or the like which is installed in or on a windshield glass or the like of the vehicle.

In particular, it is effective to use the hologram as the combiner of the HUD and to diffract an optical information to the eyesight direction of the driver. It is because the hologram possesses a feature capable of diffracting an optical information to the driver as well as functioning as a lens; a feature capable of forming an image at an optional position without using an optical system such as a lens or the like, and a feature capable of displaying an image having high brightness without deteriorating brightness of the foreground.

FIG. 17 is a diagram showing an example of a conventional HUD. Light 43 including information to be displayed, emitted from a light source 46 and passed through a transparent type liquid crystal display element 45 through a lens system 44, is irradiated on a hologram 42 arranged in a windshield glass 47 of a vehicle body. The light is diffracted at the hologram 42 to be seen by the driver at his observing position 41.

The lens system 44 functions as a collimator. Further, the lens system 44 may be omitted by sharing the function to the hologram 42. By sharing the function of a lens to the hologram 42, a speed displaying image 48 and an alarm displaying image 49 can be formed at a distant place. Since the conventional hologram 42 has a specified wavelength selective function because the half width of the diffraction spectrum is narrow as about 5–20 nm, it is possible to display an image having a color light of desired wavelength. Usually, the color to be displayed is single. However, a display having plural colors is possible, so that the quantity and quality of a displayed information can be improved. For instance, a speed displaying image 48 is shown in a green color and an alarm display image 49 is red whereby it is possible to transmit information to the driver correctly.

As described above, the half width of the diffraction spectrum of the hologram used for the conventional HUD is as narrow as about 5–20 nm. Accordingly, the hologram diffracts light having a specified wavelength. When the driver looks at something outside through the hologram, the color of light transmitted through the hologram (hereinbelow, referred to as transmission color) is the complimentary color of a displayed color corresponding to the diffraction wavelength of the hologram. Namely, as shown in FIG. 11, when a displayed color is only green, a white light 22 from outside is partly reflected and diffracted by a diffraction grating in the hologram during the transmitting of the light through the hologram 21, and the reflection light 23 becomes green. Accordingly, the transmission color (the color of transmitting light 24) is magenta (pink-red) as the complimentary color of the diffraction light and the driver may feel stimulative and uncomfortable to the transmission color. Further, the color tone of the background is also influenced by the complimentary color, and the visibility to circumstances such as a road outside the vehicle is impaired during cruising whereby a problem in driving safety may be caused.

On the other hand, as shown in FIG. 12, with respect to an observer 35 outside of the vehicle (a walking passenger or a driver in an opposing car), the color of reflection light of an outer light 32 by the hologram 31 (hereinbelow, referred to as reflection color) is substantially changed from a red color 33 (observation from the front) to a green color 34 (observation from a slant position) depending on an angle of observation. Due to the angle dependence of a diffraction wavelength by the diffraction grating in the hologram 31. The color change also gives uncomfortable impression.

FIG. 15 is a chromaticity diagram showing the color change of reflection colors. The chromaticity diagram is to show quantitatively colors by the x and y coordinates of the chromaticity coordinates ruled in Z8701 of JIS (Japan Industry Standard), which provides specification of colors according to the CIE (Commission Internationale de l'Eclairage) 1931 standard colorimetric system and the CIE 1964 supplementary standard colorimetric system. A mark X (a light source) expresses a white color (standard light source $D_{65}$). As the reflection color of the hologram is closer to this point (the mark X), the reflection color is closer to a white color, which is more preferable to an observer. The hologram used for the conventional HUD is a monochrome hologram having a narrow half width of diffraction spectrum. In such a hologram, for instance, a hologram whose diffraction spectrum has a peak wavelength of 545 nm, a half width of 15 nm and a diffraction efficiency of 60% as shown in FIG. 16, the reflection color of the hologram is changed as shown by marks ♦ in FIG. 15. A range of observation angle is ±70°. It is understood that a red color is provided around a front position and there is a great color change from an orange color through a yellow color to a green color as the position of observation shifts to a more oblique position. In particular, when viewed from the front, a red color as a stimulative color is provided to give an uncomfortable impression to the observer.

In order to improve the color tone of the transmission color and the reflection color, there have been conventionally carried out to expose a hologram having peaks with a narrow half width in diffraction spectrum multiplexly to light, or to laminate a plurality of light-exposed holograms. For instance, in the HUD disclosed in Japanese Unexamined Patent Publication No. 291221/1992, an improvement of color tone is proposed by using a hologram exposed to light having two different wavelengths which are in a relation of complimentary color, or by using a hologram exposed to light having three different wavelengths corresponding to three primary colors. However, since these methods were to use a hologram or holograms having a narrow half width of diffraction spectrum, there was a limit to improve the color tone. Namely, although there were some improvements by the conventional methods, the color obtained was far from a white color.

The range of colors which can be discriminated by a human is called color difference lumen, and there is well known a test by David L. MacAdam (Journal of the Optical Society of America, Vol. 32, No. 5, p 247–274, 1942). Since the color difference lumen forms an elliptic shape of the xy chromaticity diagram, it is called MacAdam's ellipse. The magnitude of the MacAdams ellipse is not constant on the chromaticity diagram. Accordingly, an ellipse close to the standard light source $D_{65}$ (x=0.3127, y=0.3290), is shown as an example. At a point near x=0.305 and y=0.323, δx=±0.0015 and δy=±0.002. It is understood that a very small difference of colors can be discriminated. However, the color difference lumen described above is unnecessary in practical use. A range of admissible color change can be within about δx, δy= ±0.05 in experience, more preferably, within about ±0.02.

In the conventional method wherein a plurality of holograms having a narrow half width diffraction spectrum are used, a display which satisfies the above-mentioned permissible range can not be obtained even by optimizing the diffraction wavelength. For instance, in a display comprising holograms exposed to two color lights: a first hologram having a wavelength of 545 nm, a half width of 15 nm and a diffraction efficiency of 60% and a second hologram having a wavelength of 430 nm, a half width of 15 nm and a diffraction efficiency of 60%, a change of the reflection color is shown in FIG. 13. In this case, δx=about ±0.11 and δy=about ±0.13. Further, in a case of a display comprising three holograms exposed to three different color lights, wherein a first hologram having a wavelength of 650 nm, a half width of 15 nm and a diffraction efficiency of 30%, a second hologram having a wavelength of 545 nm, a half width of 15 nm and a diffraction efficiency of 60% and a third hologram having a wavelength of 430 nm, a half width of 15 nm and a diffraction efficiency of 60%, a change of the reflection color is as shown in FIG. 14. In this case, δx=about ±0.07 and δy=about ±0.13. In either case, the degree of color change is remarkably improved in comparison with a case of the monochrome hologram shown in FIG. 15. However, the conventional methods do not satisfy the above-mentioned permissible range.

In the above, description has been made as to mainly the reflection color. However, when material for the hologram is not colored, the transmission color and the reflection color are in a relation of complimentary colors, and accordingly, the quantity of color change (δx, δy) is substantially the same as the color change of the reflection color.

On the other hand, when a half mirror without having wavelength selectivity is used for the combiner instead of the hologram, it is naturally possible to bring the reflection color and the transmission color close to white. However, the half mirror can not have a lens function. Further, an incident angle and a reflection angle of light including information to the combiner are the same, and accordingly, the arrangement of the half mirror in the vehicle is further restricted.

SUMMARY OF THE INVENTION

It is an object of the present invention to provide a head-up display and a combiner used for the same capable of eliminating the drawbacks of the conventional techniques.

According to the present invention, there is provided a head-up display which comprises an information displaying source for generating information to be displayed by means of light, wherein the information displaying source comprising at least a light source and a display device for displaying information to be displayed, and a combiner arranged in or on a windshield glass of a vehicle or the like to diffract the light to an observer, wherein the combiner is a hologram having the half width of the diffraction spectrum so that a white light entering into the vehicle from the outside is diffracted as substantially a white light.

In accordance with the present invention, there is provided a combiner for a head-up display which comprises an information displaying source for generating information to be displayed by means of light, wherein the information displaying source comprising at least a light source and a display device for displaying information to be displayed, and a combiner arranged in or on a windshield glass of a vehicle or the like to diffract the light to an observer, wherein the combiner is a hologram having the half width of the diffraction spectrum so that a white light entering into the vehicle from the outside is diffracted as substantially a white light.

In the hologram used for the present invention, the wavelength selective region of light for diffraction and the half width of the diffraction spectrum are wide. By using a HUD having the hologram as a combiner, the color tone of transmission light can be close to a white color even when the transmission light is a complimentary color light of diffraction (reflection) light. Further, the color tone of reflection light can be close to a white color in comparison with a HUD having a conventional hologram. As a result, a clear eyesight free from any complimentary color can be provided to a driver to increase safety. Further, a HUD having a color tone of nearly white and minimizing a color change due to an angle to an observer outside the vehicle, can be provided.

Further, the hologram used for the invention has a smaller diffraction efficiency while the wavelength selective region of light for diffraction is widened and light covering substantially an entire visible light wavelength region can be diffracted. Accordingly, light from the outside of the vehicle sufficiently enters into the vehicle, and the color tone of the diffraction light can be close to a white color.

In addition, by irradiating a plurality of color lights from the information displaying source, the combiner can be utilized for a color display. Accordingly, the HUD in which the transmission color and the reflection color of an outer light are nearly white can be provided.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 3b is a diagram showing the emission spectrum of a light source used for the light-emitting display shown in FIG. 3a;

DETAILED DESCRIPTION OF THE PREFERRED EMBODIMENTS

Figure 1:
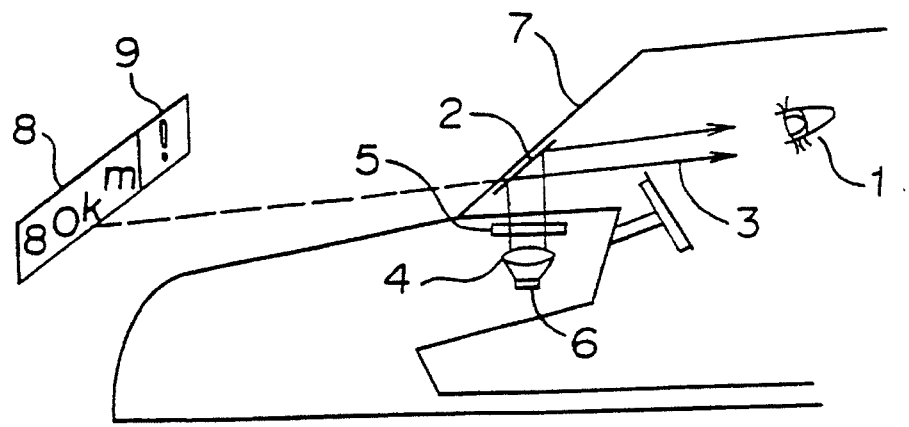
FIG. 1 is a schematic view showing an embodiment of the HUD according to the present invention.

Preferred embodiments of the present invention will be described with reference to the drawings wherein the same reference numerals designate the same or corresponding parts.

FIG. 1 is a schematic view showing an embodiment of the HUD according to the present invention. An information displaying source is disposed below a windshield glass 7 of a vehicle. The information display source comprises a light source 6, a lens system 4 as a collimator and a display device 5 comprising a transparent type liquid crystal display element wherein light from the light source 6 is passed through the display device 5 via the lens system 4 whereby light 3 as information to be displayed is produced. The light is irradiated on a combiner comprising a hologram 2 provided on the windshield glass 7 of the vehicle, and the light is diffracted by the hologram 2 to be recognized by a driver at its position 1 of observation. The lens system 4 has a function as the collimator. However, the lens system 4 can be omitted by sharing its function to the hologram 2. By sharing the function as a lens to the hologram 2, a speed display image 8 and an alarm image 9 can be focused in the distance.

The diffraction spectrum of the hologram 2 has a wide half width so that the color of light from the light source 6 can be substantially reproduced as the color of an image. Accordingly, by changing the color of light emitted from the light source, an image having a desired color can be displayed. A multi-color display is possible by a plurality of colors from the light source, whereby the quantity and the quality of a displayed information are improved. For instance, by rendering colors for the speed display image 8 and the alarm display image 9 are respectively green and red, information can be correctly provided to the driver.

When the half width of the spectrum of light from the light source is wide, chromatic aberration caused by the hologram becomes remarkable. Accordingly, a light source having a narrow half width of the spectrum of light such as a hot cathode tube may be used, or a second hologram for aberration correction may be disposed between the displaying device 5 and the hologram 2 as a combiner.

As measures to reduce the chromatic aberration by the hologram, there is proposed to reduce the half width of the spectrum of light entering into the hologram. As specific measures, two measures are exemplified as follows.

Figure 3A:
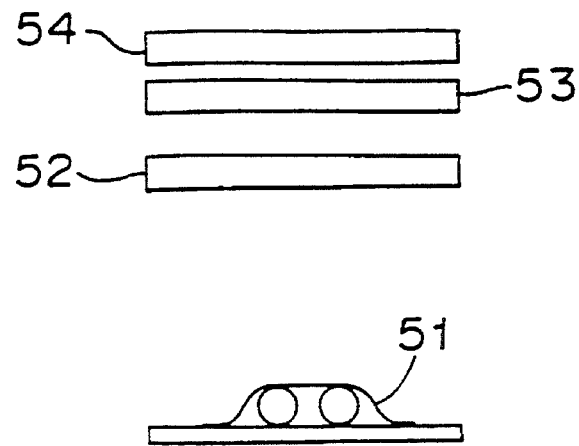
FIG. 3a is a schematic cross-sectional view showing an embodiment of a light-emitting display means for the present invention.
Figure 3B:
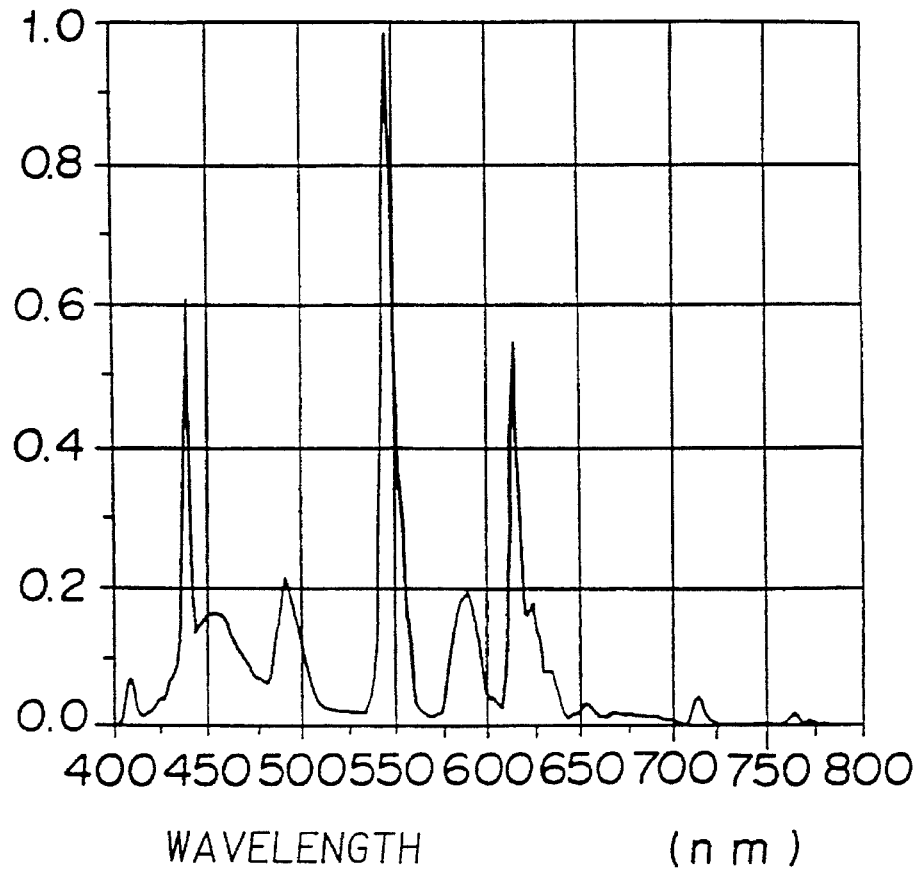

FIG. 3a is a schematic view showing an embodiment of an important portion of the information displaying source of the present invention. Reference numeral 51 designates a combination of a hot cathode tube as a light source and a jig for holding the hot cathode tube, numeral 52 designates a diffuser, numeral 53 designates a display device, and numeral 54 designates an optical filter. In FIG. 3a, two hot cathode tubes having high color rendering properties, each having a tube diameter of 8 mm and a tube length of 119 mm are used. An emission spectrum obtained is shown in FIG. 3b. The construction of the information displaying source is not particularly limited as far as the half width of the spectrum of light emitted therefrom is narrow. For instance, in order to include information to light beams from the light source 51, the display device 53 comprising a transparent type display element is provided above the information displaying source, and the diffuser 52 is disposed between the light source 51 and the display device 53 to thereby eliminate non-uniformity of illuminance of light beams from the light source. Further, the optical filter 54 is disposed in front of the display device 53 in such a manner that for instance, a display in the speed displaying device is expressed by a green color, a display in the alarm displaying device is expressed by a red color and a display in a direction indicating device is expressed by a blue color, whereby a high quality of information display becomes possible.

In this example, the diffuser plate 52 is formed by processing a white acrylic plate (Opal No. 422 by Mitsubishi Rayon). As the optical filter 54, a deposited interference filter having a central wavelength of 440 nm and a half width of 7 nm for a blue portion, a central wavelength of 545 nm and a half width of 8 nm for a green portion and a central wavelength of 610 nm and a half width of 9.5 nm for a red portion is used. However, the diffuser 52 and the optical filter 54 are not limited to the above-mentioned construction. For the display device 53, a so-called non-emissive type display element using liquid crystal is preferably used. In particular, a very high contrast LCD having an excellent contrast ratio is used in this embodiment.

For the light source 51, a cold cathode tube or a semiconductor laser may be used other than the hot cathode tube. In order to improve the quality of an image to be displayed, a light source having a narrow half width is desired, e.g. a light source having an emission line spectrum is desirable.

Figure 4:
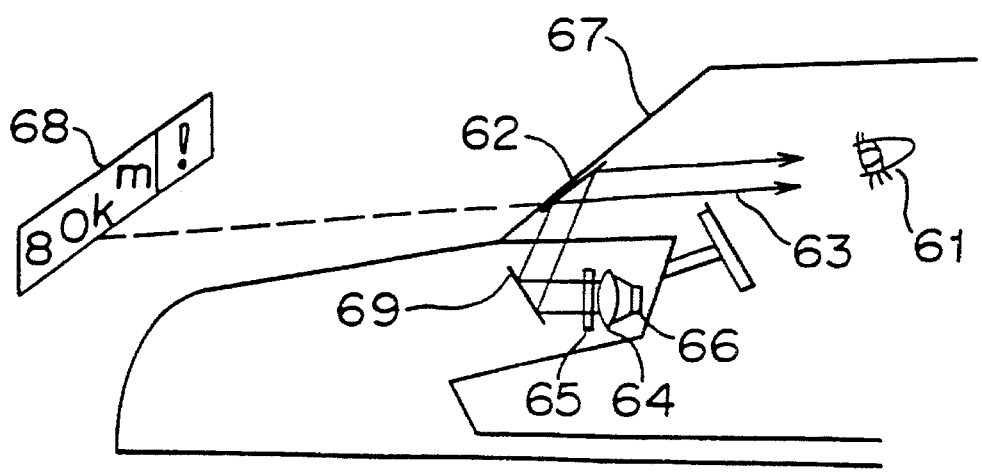
FIG. 4 is a schematic view showing another embodiment of the HUD.

FIG. 4 is a schematic view showing another embodiment of the HUD according to the present invention.

The HUD comprises a light source 66, a lens system 64 as a collimator, a transparent type liquid crystal display element 65, a combiner comprising a first hologram 62 provided on a windshield glass 67 of a vehicle, and a second hologram 69 for correcting aberration. Light beams emitted from the light source 66 are passed through the lens system 64 and the transparent type liquid crystal display element 65 to be diffracted by the second hologram 69. The diffracted light beams are further diffracted by the first hologram 62 to be recognized by a driver at its position of observation 61. The information to be displayed is recognized by the driver as a virtual image at a position 68.

Figure 5:
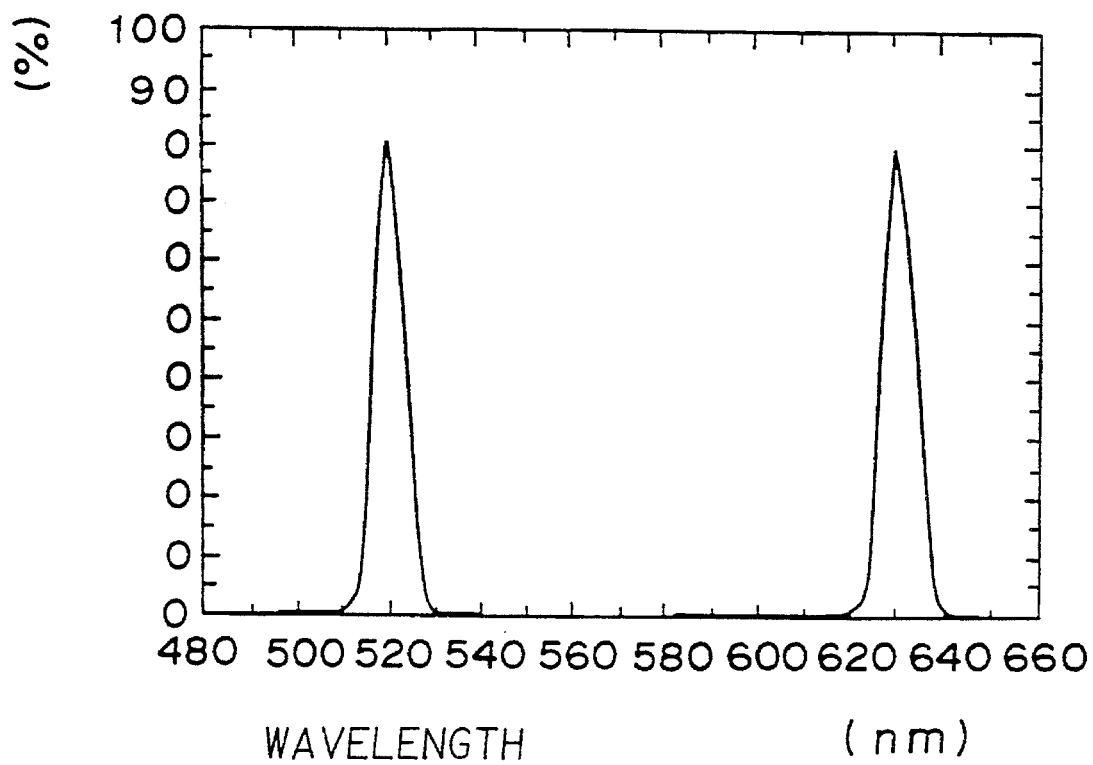
FIG. 5 is a diagram showing the diffraction spectrum of a second hologram used for aberration correction shown in FIG. 4.

The second hologram 69 is formed by the exposure to light so that the aberration by the first hologram 62 can be corrected. FIG. 5 is a diagram showing an example of the diffraction spectrum of the second hologram. In FIG. 5, the central wavelengths are 520 nm and 630 nm. Two holograms of 25 µm thick, each having a diffraction efficiency of 80% and a half width of 15 nm, are laminated. The second hologram may be disposed in an instrument panel. The reason of using two laminated 25 µm holograms is that the limitation to the thickness is not severe, and it is desirable for the second hologram to have a larger diffraction efficiency from the viewpoint of the matching to the first hologram.

In the above-mentioned embodiment, although the central wavelengths of the diffraction wavelength of the second hologram are 520 nm and 630 nm respectively, to obtain a display of red and green colors, the present invention is not particularly limited to the wavelengths, but a single wavelength may be used. Further, it is possible to laminate a plurality of holograms having other central wavelengths in order to obtain the other display colors. Further, in the same manner as the first hologram, a single photosensitive material may be exposed multiplexly to light. In addition, the diffraction efficiency of the second hologram is not particularly limited as far as the second hologram possesses a function of correcting the aberration of the first hologram.

For instance, when aberration is caused in a manner that a color dispersed image such as a rainbow is produced by the first hologram because of the diffraction angle dependence on wavelength due to Bragg's law, the aberration can be corrected by disposing the second hologram which is exposed to light to have an inverse function. With respect to another kind of aberration, it can be corrected by determining the conditions of light exposure, a position and an angle of arrangement for the second hologram.

The second hologram used in the present invention may be a transparent type hologram other than the above-mentioned reflection type hologram. In this case, the information displaying source and the distance to the first hologram can be suitably selected.

The half width of the spectrum of light from the information displaying source can be reduced by disposing an optical filter having a narrow half width between the information displaying source and the hologram. In such a case, there is in particular no limitation to the light source, and it is possible to use a halogen lamp or the like which has no bright line spectrum.

In the present invention, the half width of the diffraction spectrum of the hologram is wide and the wavelength selective region of the diffraction light by the hologram is widened. In other words, the half width of the spectrum of light diffracted by the hologram is wide. The diffraction spectrum may be a spectrum having a single central peak wavelength, or a spectrum having a plurality of peaks which are formed by superposing spectra each having a single peak wavelength (reference to FIG. 2).

In order to widen the wavelength selective region of the diffraction light by the hologram, the half width can be widened by subjecting a hologram previously exposed to light to a chemical chirping treatment. In this case, a plurality of holograms in which a plurality of photosensitive materials are exposed to light having different wavelength are laminated. Or, lights having different wavelengths are irradiated to a single photosensitive material to effect multiple exposure to light. Thus, a hologram, or holograms having a plurality of diffraction wavelengths can be obtained. The chirping treatment is conducted to the hologram or the holograms obtained whereby the hologram or the holograms having widened wavelength selective properties can be obtained. In the hologram having a plurality of diffraction wavelengths, such a hologram obtained by multiple light exposure is preferable because the shifting of an image in each color by the lamination is small, and the reduction of the transmittance of the combiner is small.

There are several ways to conduct the chirping treatment. Explanation is made as to a case of using an acrylic series photopolymer film. An ordinary hologram is exposed to light; another film for chirping including an acrylic series monomer is laminated on the hologram, and then, heat treatment is conducted to the laminate. The monomer in the film for chirping diffused through the interface into the hologram effect thermal polymerization. When the monomer is diffused and polymerized in the hologram, the distance of the diffraction grating which has been originally formed by the light exposure can be widened. Namely, the reconstruction wavelength of the hologram can be elongated. Since the concentration of the diffused monomer has a distribution in the direction of the thickness of the hologram, there results a distribution in the direction to spread the distance of the diffraction grating depending on a distribution of the concentration. In other words, the reconstruction wavelength is expanded, and accordingly, the half width is widened. The widening of the half width is determined depending on a distribution of the monomer and can be controlled by the temperature and the time of the heat treatment. For another photosensitive material, for instance, in the case of dichromate gelatin, the half width of the hologram depends on the speed of a developing treatment after the light exposure. Specifically, the half width can be widened by increasing the temperature of the developing treatment.

The half width of the diffraction spectrum of the hologram in the present invention is such a width that the diffraction light has substantially a white color when a white light from the outside of the vehicle is diffracted by the hologram. Specifically, for a central wavelength of the light of about 490 nm, for instance, corresponding to a green color light, the half width is preferably 200 nm or more. When it is desired that the diffraction light is substantially a white light, the half width is more preferably 300 nm or more.

It is sufficient that the half width of the diffraction spectrum covers a visible light region. Accordingly, when the central wavelength has the above-mentioned value, it is sufficient that the half width of the diffraction spectrum is 400 nm or lower.

Thus, outer light entering from the outside of the vehicle into the cabin has a complimentary color of the diffraction light. Accordingly, a specified stimulating color is not produced in the transmission light. The improvement of the color tone of the diffraction light (diffraction color) improves the color tone of the transmission light (transmission color). Since the hologram used for the present invention can diffract the substantial amount of light in the visible light region, it may be insufficient to assure the eyesight of the driver as an observer to the scenery outside the vehicle. Accordingly, the preferable diffraction efficiency of the hologram for the present invention is 30% or less because the transmittance of the outer light to the observer can be assured to be 70% or more. Further, safetyness of the vehicle can be maintained by using various ways to keep the eyesight without using the above-mentioned diffraction efficiency.

It is desirable that the incident angle of light to the hologram is substantially the same with respect to all colors, and the diffraction angle of light from the hologram is substantially the same with respect to all colors. When there is difference in the angle, the direction of diffracted light is different depending on each color, and a white color to be displayed is divided into a plurality of colors, whereby the observer may feel some colors to be uncomfortable.

The reflection type hologram wherein the incident angle of light to the hologram is the same with respect to all colors and a diffraction angle of light to the hologram is the same with respect to all colors is prepared as follows. The incident angle of light to be irradiated on both sides of a photosensitive material is determined to be the same with respect to the wavelength corresponding to colors to be used at each of the sides of photosensitive materials. It is not always necessary to irradiate light with the same incident angle. By suitably adjusting a relation of the two angles of light incident to the both sides of the photosensitive material of the hologram, the incident angle and the emission angle can be the same for all colors.

A hologram generally has a surface area of a square several tens mm through several hundreds mm and a thickness of from several μm through several tens μm, and has a light diffraction function. For the hologram, a volume-phase type hologram such as a Lipman type is preferable because a high diffraction efficiency can be obtained. However, an emboss type hologram or a rainbow type hologram or the like can be used. As a material for the hologram, a photopolymer such as polyvinylcarbazol and an acryl series, dichromated gelatin, photoresist, silver halide emulsions and so on may be used.

The hologram may be arranged, for instance, on the front surface (the outer front surface) of the windshield glass or the surface in the cabin side of a vehicle. From the viewpoint of the protection of the hologram, it is preferable to seal it inside a windshield glass formed of a laminated glass.

The information displaying source used for the present invention has a function of emitting light for a display. Light emitted from a light source such as a hot cathode tube (HCT), a cold cathode tube, a vacuum fluorescent display tube (VFD), a halogen lamp, a light emission diode (LED), a semiconductor laser (LD) or the like is irradiated to a display device such as a liquid crystal display element, i.e. a light receiving type display element. A suitable device having the above-mentioned function may be used.

When the combiner for the present invention is used for a color display, a color liquid crystal display element comprising a color filter and a transparent type twist nematic liquid crystal element or a supertwist nematic type liquid crystal display element is preferably used so that light emitted from a single light source is irradiated as light having a desired color.

Thus, light having a plurality of colors can be produced from the same information displaying source. When the light having a plurality of colors is displayed, a display image is displayed in an overlapping state. In order to prevent the overlapping of the display image, a suitable combination of the color filter and the light source can be used, or the color liquid crystal display element can be controlled so as not to irradiate simultaneously a plurality of color lights.

Alternatively, a plurality of light sources are arranged in a pattern without using the light receiving type display element, so that a specified information can be produced as light. In a case of combining the light source with the light receiving type display element, a suitable light aligning means such as a lens system, a reflector having a curved surface and/or a suitable light guide means such as a light introducing plate may be arranged between the light receiving type display element and the light source. Further, a light polarizing element such as polarizer or a non-linear optical element such as $KNO_3$ may be arranged in a light path before the hologram if necessary.

When the HUD of the present invention is used for a color display, a colored image can be formed in the same plane by determining the distance from the combiner to the displayed image to be the same with respect to each color. Further, when the distance is changed for a specified color, a three-dimensional image in which the distance is different for a displayed color can be obtained.

The hologram used for the present invention may be a transparent hologram instead of the above-mentioned reflection type hologram.

A preferred embodiment of the present invention will be described with reference to FIG. 1.

EXAMPLE 1

Figure 2:
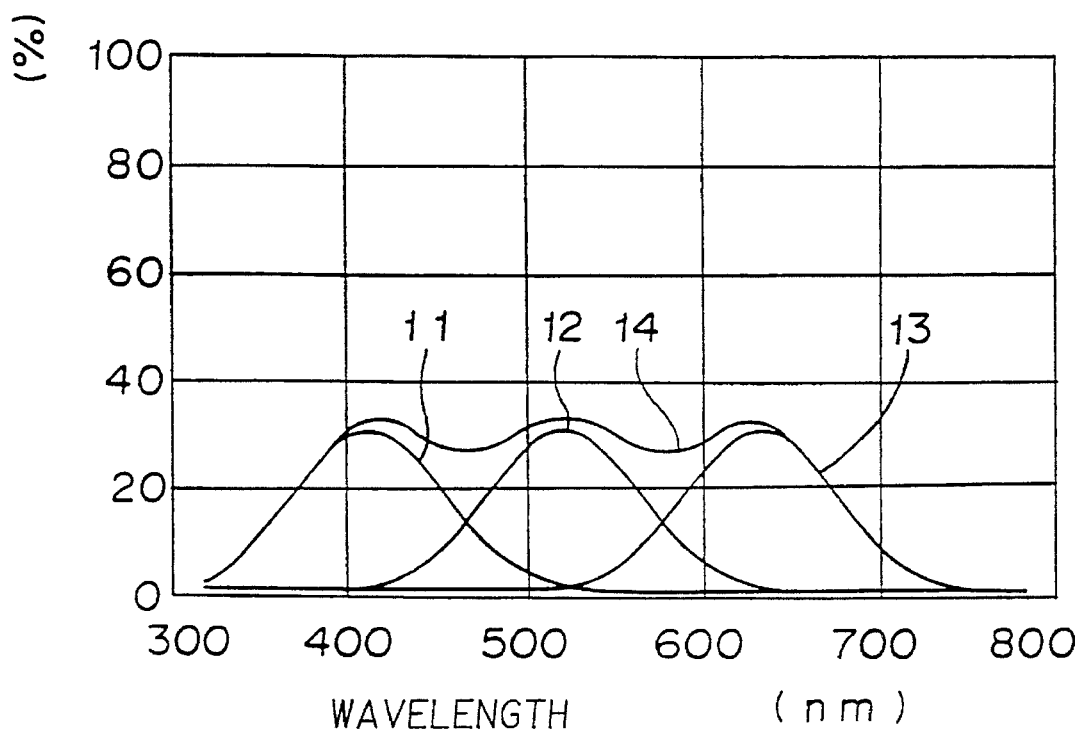
FIG. 2 is a diagram showing the diffraction spectrum of a hologram used for the first embodiment of the present invention.

FIG. 2 is a diagram showing the diffraction spectrum of diffracted light by a hologram as a combiner for the HUD according to the present invention. In this embodiment, three holograms each having a half width of 100 nm and a diffraction efficiency of 30% are laminated. Reference 11 designates a spectrum having a central wavelength of 410 nm, numeral 12 designates a spectrum having a central wavelength of 520 nm, numeral 13 designates a spectrum having a central wavelength of 630 nm, and numeral 14 designates a spectrum formed by combining the spectra 11, 12 and 13.

Figure 6:
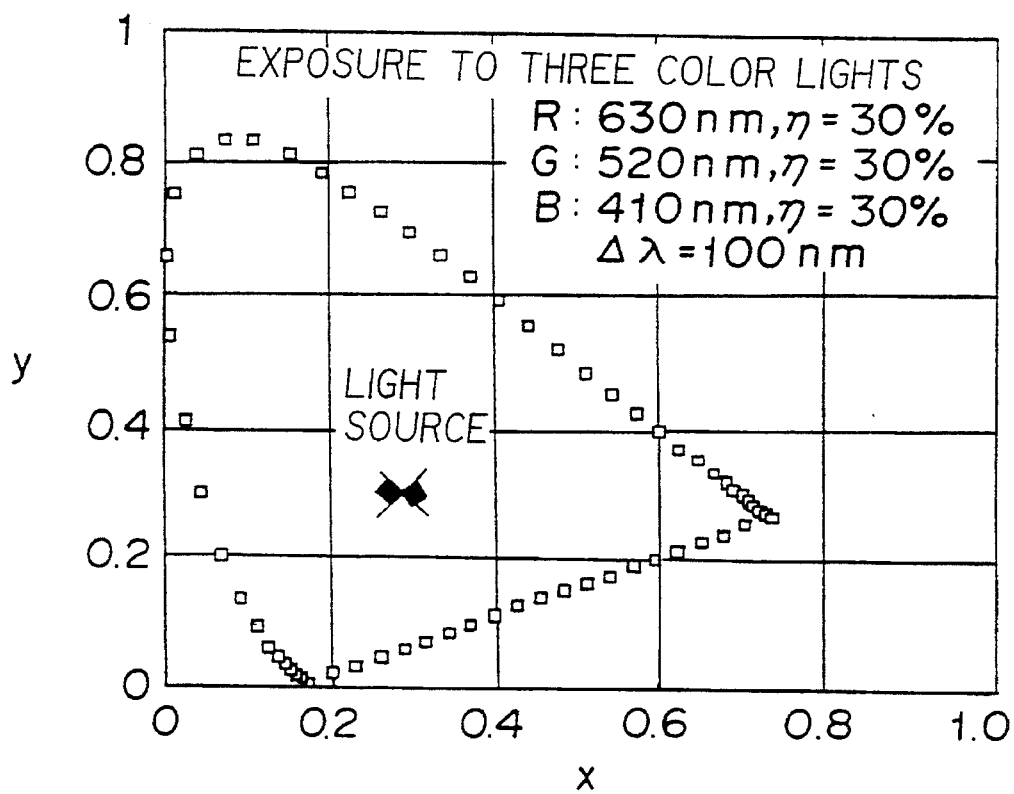
FIG. 6 is a chromaticity diagram showing a change of the reflection color of the hologram of the first embodiment.

FIG. 6 is a chromaticity diagram showing a color change of the reflection color of outer light by the hologram having the diffraction spectrum of a wide half width thus prepared. In FIG. 6, a mark ♦ is a value of a color change at an observation angle of ±70°, and a mark X indicates a standard light source $D_{65}$. There is no substantial color change caused by the observation angle, and δx, δy<0.02 which satisfies the permissible range.

In this case, the transmitting color is approximately in a relation of a complimentary color to the reflection color. The color change of the transmitting color is substantially the same as the reflection color, and the color tone is nearly white.

Thus, the hologram of the present invention can improve the color tone as well as the reflection color and the transmitting color of the outer light. The hologram is sealed inside a laminate glass as the windshield glass for the vehicle. A HUD with the hologram which improves the color tone of the reflection color and the transmitting color of the outer light can be obtained.

EXAMPLE 2

In this Example, a hologram having a wide half width of the diffraction spectrum wherein the hologram is multiplexly exposed to light and chemically chirped, is used. The central wavelength is 490 nm, the half width is 400 nm and the diffraction efficiency is 30%.

Figure 8:
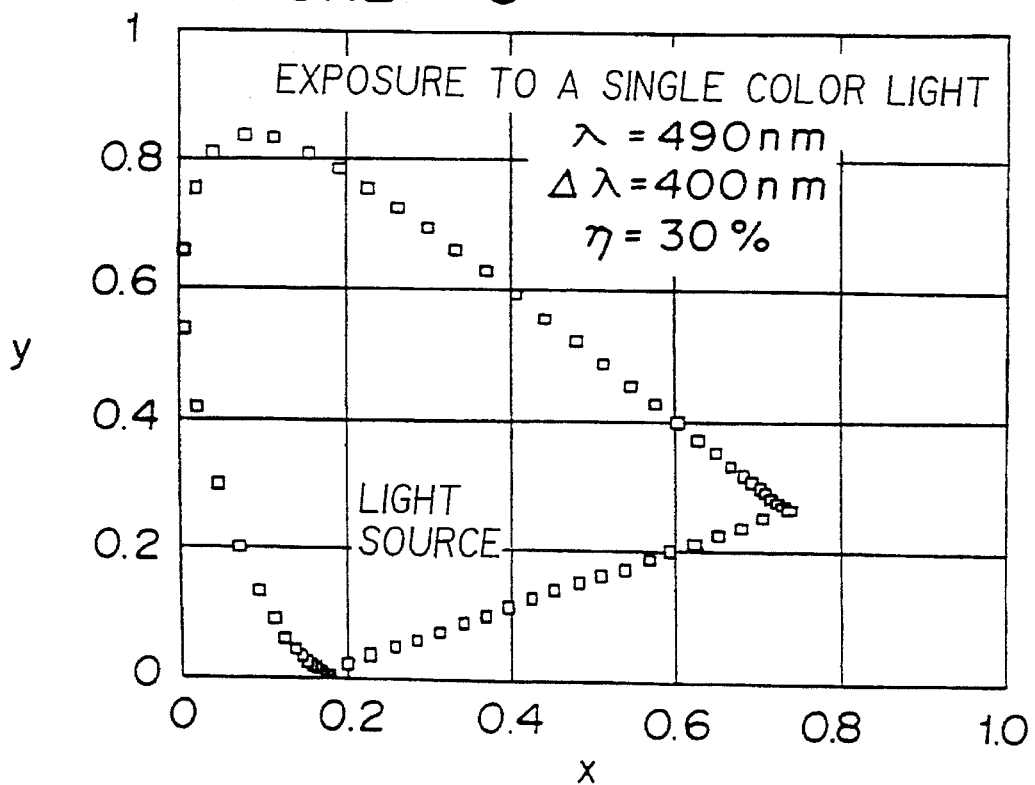
FIG. 8 is a chromaticity diagram showing a change of the reflection color of outer light in the hologram according to the second embodiment.
Figure 7:
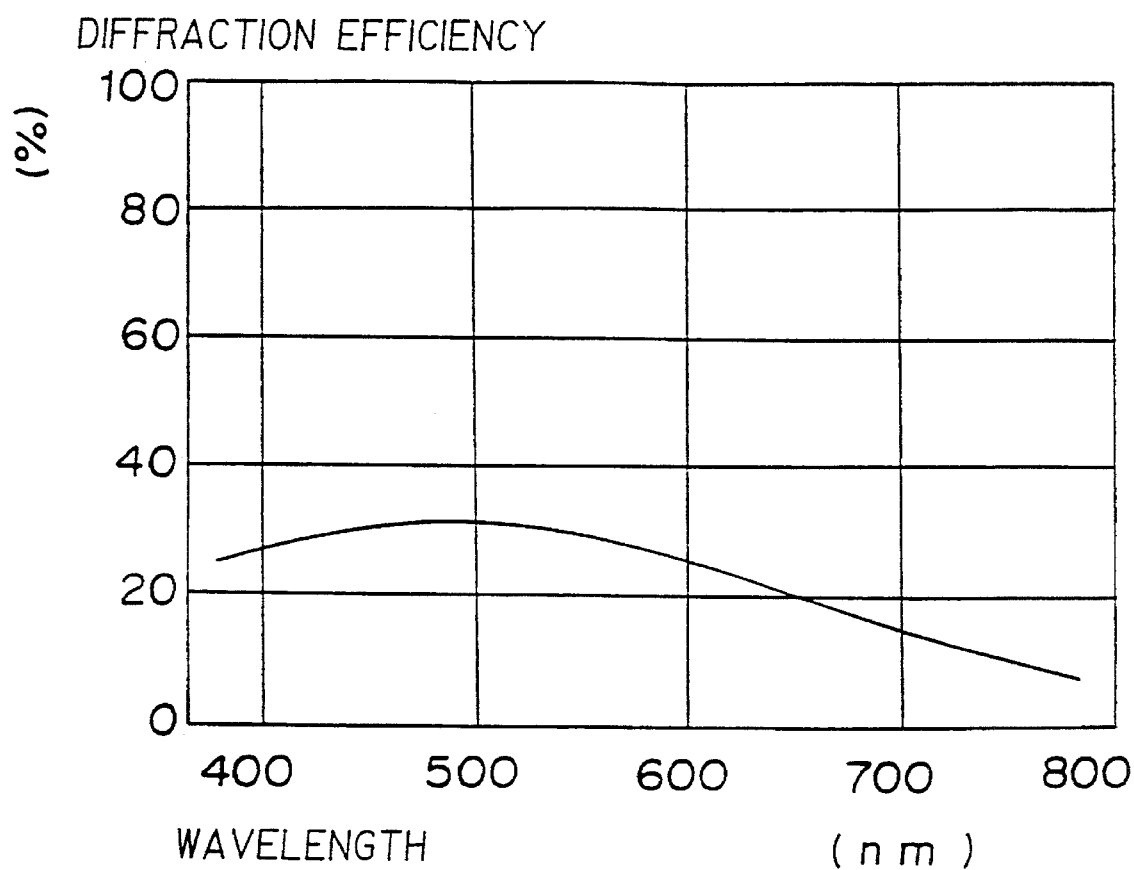
FIG. 7 is a diagram showing the diffraction spectrum of the hologram of the second embodiment.

FIG. 7 is a diagram showing the diffraction spectrum of the hologram of this example, and FIG. 8 is a chromaticity diagram showing a change of the reflection color of outer light by the hologram. A color change caused by the difference of an observation angle is small, and δx, δy≈0.025 which satisfies the permissible range.

In this case, the transmitting color is approximately in a relation of a complimentary color to the reflection color. The color change is substantially the same as the reflection color, and the color tone is nearly white.

Thus, the hologram of the present invention can improve the color tone as well as the reflection color and the transmitting color of the outer light. The hologram is sealed inside a laminate glass as a windshield glass for a vehicle. A HUD with the hologram which improves the color tone of the reflection color and the transmitting color of the outer light can be obtained.

EXAMPLE 3

In this Example, a single hologram having a wide half and a base-like diffraction spectrum is used. The central wavelength is 490 nm, the half width is 400 nm and the diffraction efficiency is 30%.

Figure 9:
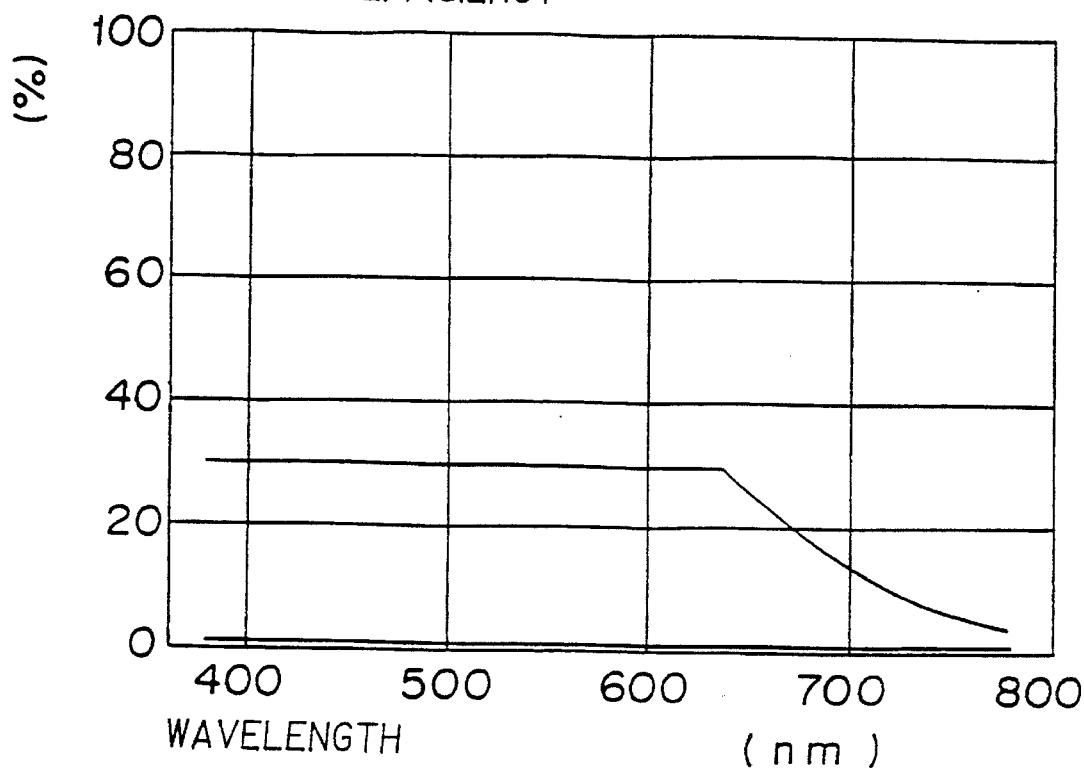
FIG. 9 is a diagram showing the diffraction spectrum of the hologram according to a third embodiment of the present invention.
Figure 10:
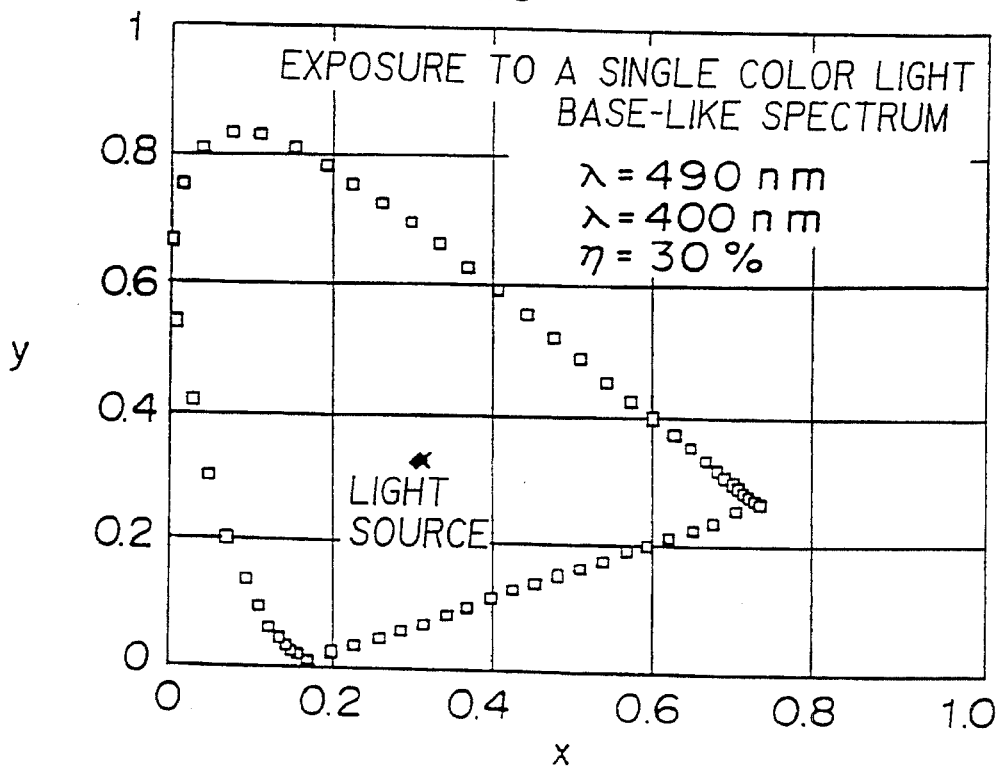
FIG. 10 is a chromaticity diagram showing a change of the reflection color of outer light in the hologram according to the third embodiment of the present invention.
Figure 11:
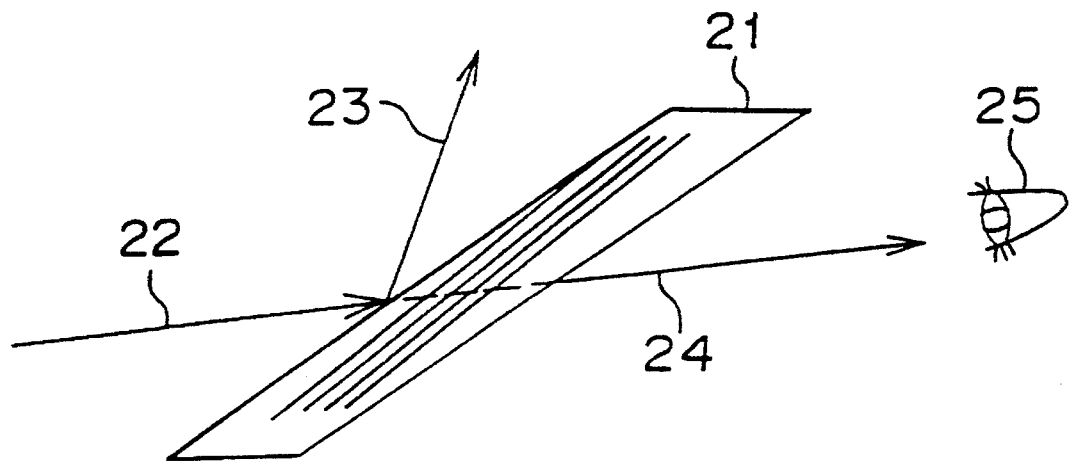
FIG. 11 is a diagram for illustrating the color of light transmitting a conventional hologram.
Figure 12:
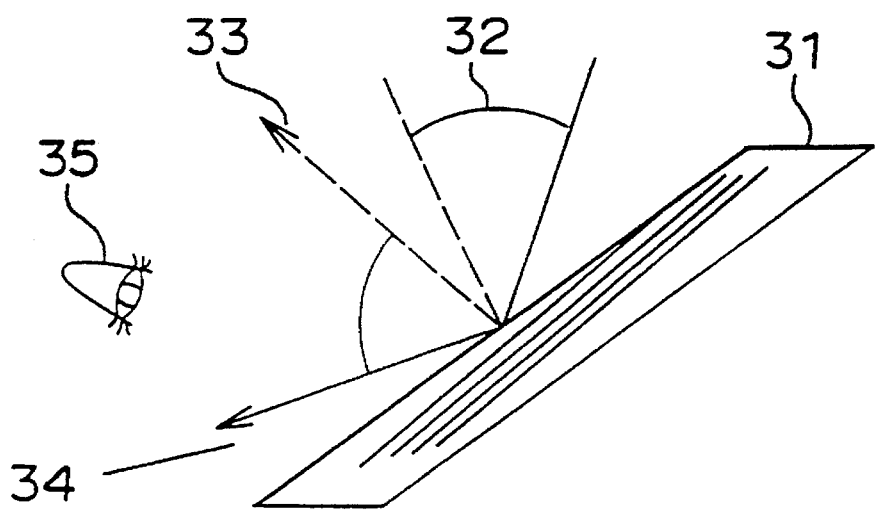
FIG. 12 is a diagram of illustrating the reflection color of light of the conventional hologram.
Figure 13:
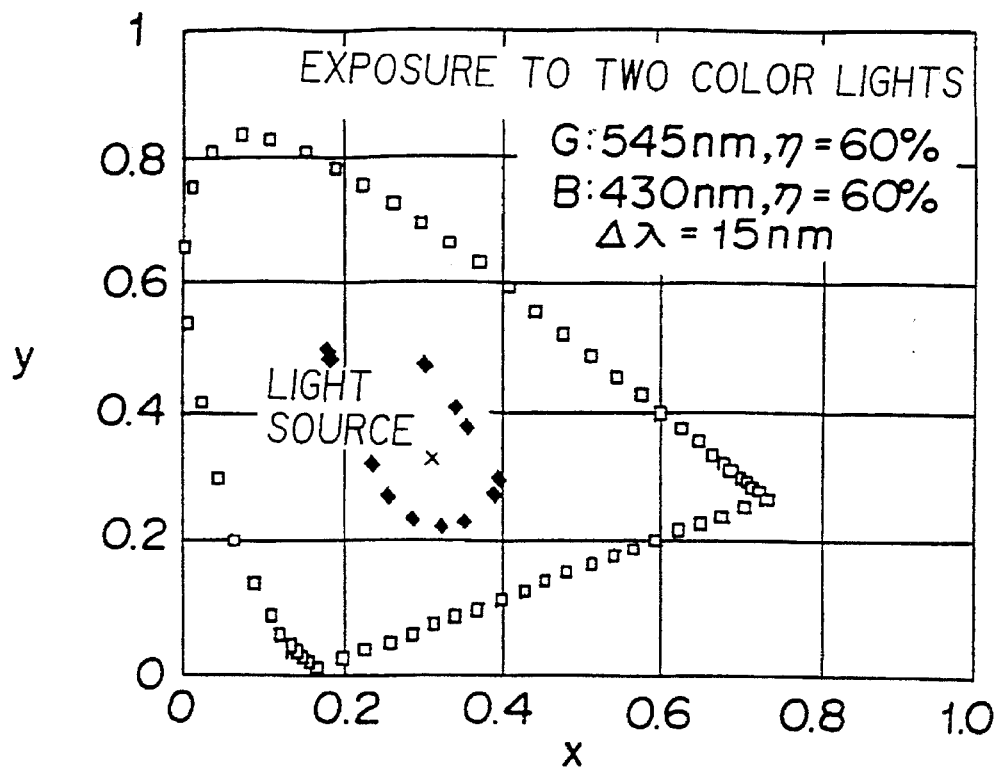
FIG. 13 is a chromaticity diagram showing a change of the reflection color of outer light in the conventional hologram.
Figure 14:
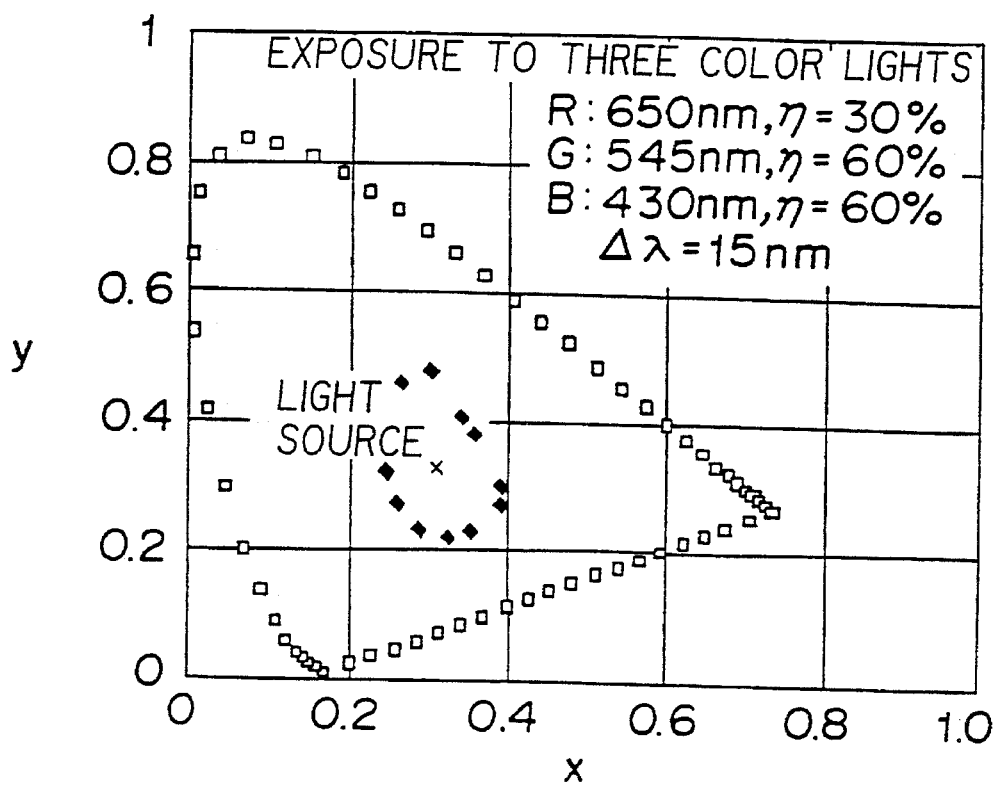
FIG. 14 is a chromaticity diagram showing a change of the reflection color of outer light in the conventional hologram.
Figure 15:
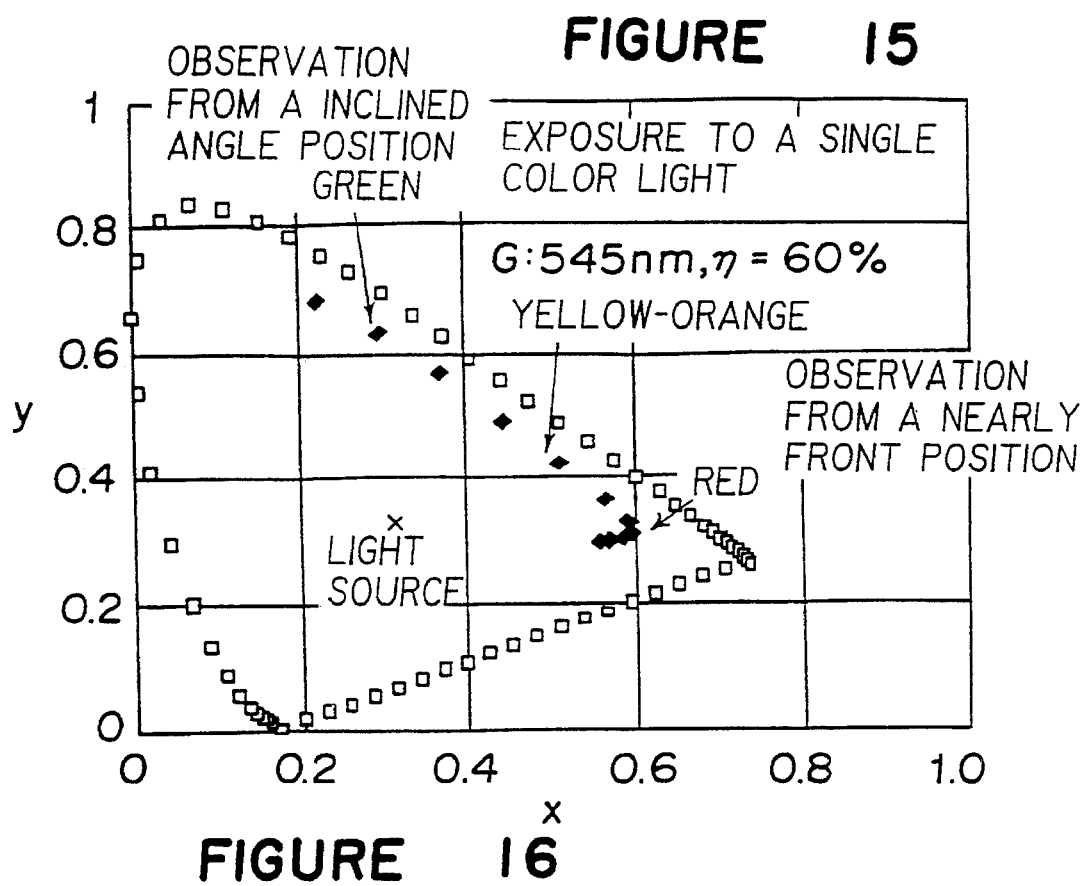
FIG. 15 is a chromaticity diagram showing a change of the reflection color of outer light in the conventional hologram.
Figure 16:
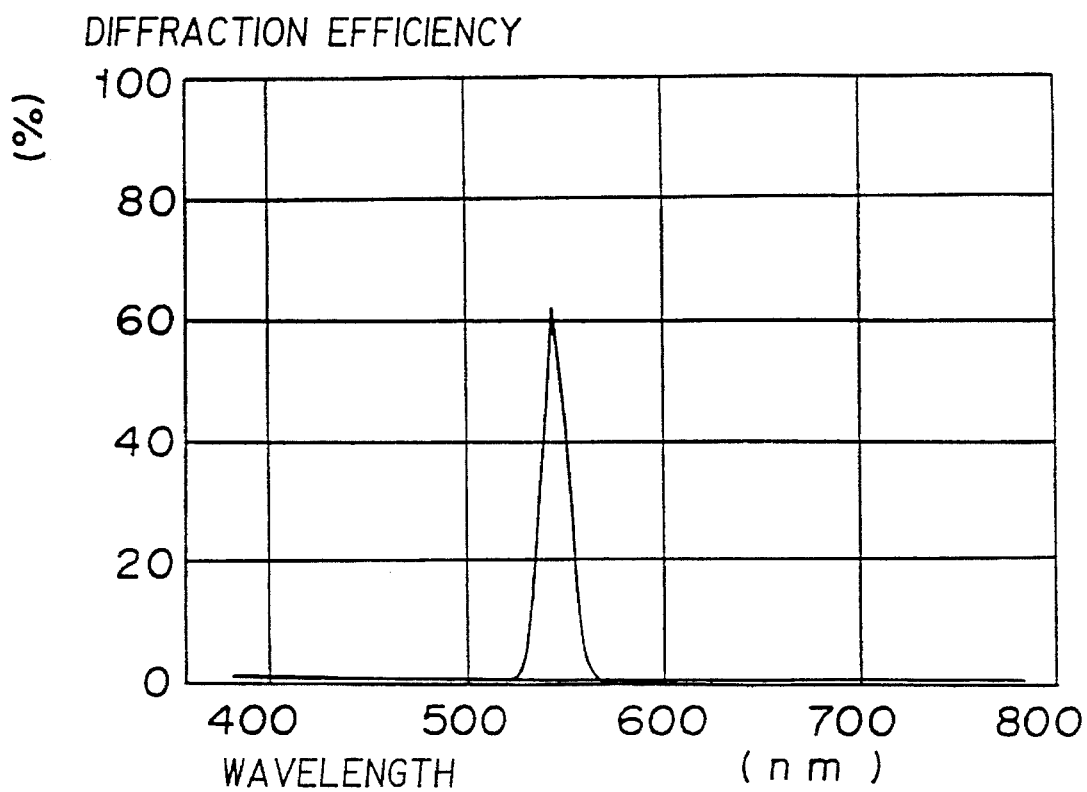
FIG. 16 is a diagram showing the diffraction spectrum of the conventional hologram.
Figure 17:
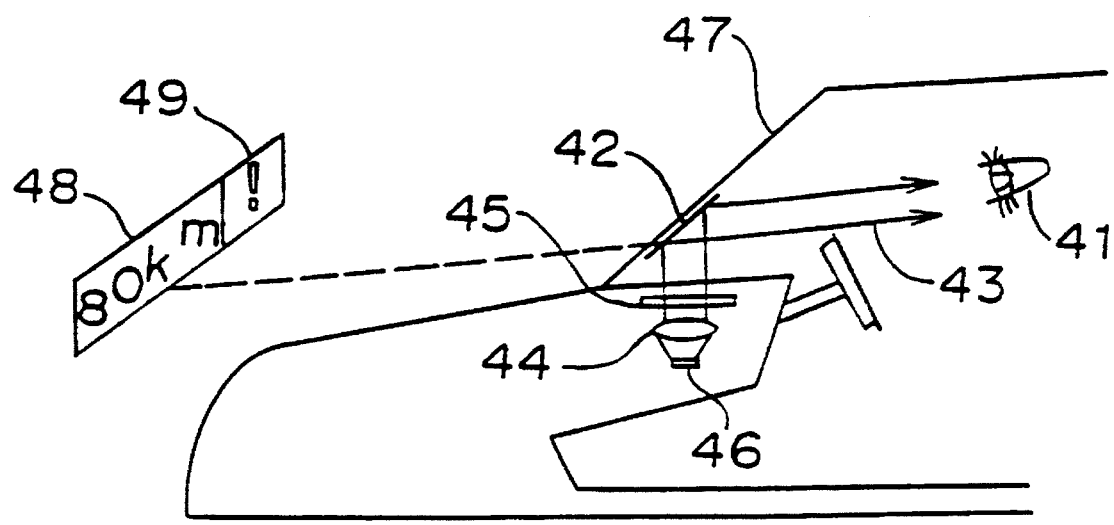
FIG. 17 is a schematic view showing an example of a conventional HUD.

FIG. 9 is a diagram showing the spectrum of light diffracted by the hologram, and FIG. 10 is a chromaticity diagram showing a change of the reflection color of the outer light by the hologram. A change of color by the observation angle is small, and δx, δy< 0.02 which satisfies the permissible range.

In this case, the transmission color is approximately in a relation of a complimentary color to the reflection color. The color change is substantially the same as the reflection color and the color tone is nearly white. The hologram of the present invention can improve the color tone as well as the reflection color and the transmitting color of the outer light. The hologram is sealed inside a laminate glass as a windshield glass for a vehicle. A HUD with the hologram which improves the color tone of the reflection color and the transmitting color of the outer light can be obtained.

In accordance with the HUD of the present invention wherein the half width of the diffraction spectrum of a hologram used for a combiner is wide, and the wavelength selective region of the diffraction (reflection) light is widened, the color tone of the transmitting light can be near colorless even when the transmitting light is the complimentary color of the diffraction light. Further, the color tone of reflection light can be near colorless in comparison with a conventional hologram. As a result, a driver of a vehicle can have a clear eyesight without any complimentary color and a safe driving is obtainable. For an observer outside the vehicle, the HUD minimizing a color change caused by an angle of observation and having a color tone nearly colorless can be provided.

Further, when a plurality of color lights are emitted from an information displaying source, the combiner can be utilized as a combiner for color display. Accordingly, a color HUD wherein the transmitting color and the reflection color of the outer light is nearly colorless can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A head-up display comprising:
    an information displaying source for generating information to be displayed by means of light, comprising at least a light source and a display device for displaying information to be displayed; and
    a combiner arranged in or on a windshield glass of a vehicle to diffract light to an observer, wherein the combiner comprises a hologram having a diffraction spectrum which has, as a central peak wavelength, a wavelength of light corresponding to a green color, and a half width between 200–400 nm, so that a white light entering into the vehicle from outside is diffracted as substantially a white light.

2. The head-up display according to claim 1, wherein the combiner has a diffraction efficiency of 30% or less.

3. The head-up display according to claim 1, wherein the hologram of the combiner is exposed multiplexly to lights having wavelengths corresponding to a plurality of colors.

4. The head-up display according to claim 1, wherein the hologram of the combiner is formed by laminating a plurality of holograms exposed to lights having wavelengths corresponding to a plurality of colors.

5. The head-up display according to claim 1, wherein a half-width of a spectrum of light emitted from the information displaying source is 20 nm or less.

6. The head-up display according to claim 1, further comprising a second hologram exposed to light so as to correct an aberration of the combiner, and being interposed between the information displaying source and the combiner, and where a half width of a diffraction spectrum of the second hologram is 20 nm or less.

7. A combiner for a head-up display comprising:
    an information displaying source for generating information to be displayed by means of light, comprising at least a light source and a display device for displaying information to be displayed; and
    a combiner arranged in or on a windshield glass of a vehicle to diffract light to an observer, wherein the combiner comprises a hologram having a diffraction spectrum which has, as a central peak wavelength, a wavelength of light corresponding to a green color, and a half width between 200–400 nm, so that a white light entering into the vehicle from outside is diffracted as substantially a white light.

8. The combiner according to claim 7, wherein the combiner is the hologram having a diffraction efficiency of 30% or less.

9. The combiner according to claim 7, wherein the hologram of the combiner is exposed multiplexly to lights having wavelengths corresponding to a plurality of colors.

10. The combiner according to claim 7, wherein the hologram of the combiner is formed by laminating a plurality of holograms exposed to lights having wavelengths corresponding to a plurality of colors.

11. A head-up display comprising:
    an information displaying source for generating information to be displayed by means of light, comprising at least a light source and a display device to display information to be displayed; and
    a combiner arranged in or on a windshield glass of a vehicle to diffract light to an observer, wherein the combiner comprises a hologram having a diffraction spectrum which has, as central peak wavelengths, wavelengths of light corresponding to blue, green and red colors, each having respective spectra with half widths greater than 80 nm which are superpositioned, so that a white light entering into the vehicle from outside is diffracted as substantially a white light.

* * * * *